(12) United States Patent
Zhuang et al.

(10) Patent No.: US 11,324,202 B2
(45) Date of Patent: May 10, 2022

(54) INTELLIGENT METHOD AND SYSTEM FOR MONITORING PIG BEHAVIOR ABNORMALITY

(71) Applicant: Agricultural Information Institute of CAAS, Beijing (CN)

(72) Inventors: Jiayu Zhuang, Beijing (CN); Shiwei Xu, Beijing (CN); Jiaying Di, Beijing (CN); Jiajia Liu, Beijing (CN)

(73) Assignee: Agricultural Information Institute of CAAS, Beijing (CN)

( * ) Notice: Subject to any disclaimer, the term of this patent is extended or adjusted under 35 U.S.C. 154(b) by 253 days.

(21) Appl. No.: 16/860,309

(22) Filed: Apr. 28, 2020

(65) Prior Publication Data

US 2021/0251195 A1 Aug. 19, 2021

(30) Foreign Application Priority Data

Feb. 19, 2020 (CN) .......................... 202010101545.7

(51) Int. Cl.
*G08B 21/00* (2006.01)
*A01K 29/00* (2006.01)
(Continued)

(52) U.S. Cl.
CPC ............. *A01K 29/00* (2013.01); *A01K 1/0209* (2013.01); *A01K 1/10* (2013.01); *A01K 5/01* (2013.01);
(Continued)

(58) Field of Classification Search
CPC ........ A01K 29/00; A01K 1/0209; A01K 1/10; A01K 5/01; A01K 29/005; G06N 3/04;
(Continued)

(56) References Cited

U.S. PATENT DOCUMENTS

2007/0000216 A1* 1/2007 Kater .................. A61B 5/1038
54/1
2011/0298619 A1* 12/2011 O'Hare ................ A61D 17/002
340/573.1
(Continued)

*Primary Examiner* — Mark S Rushing
(74) *Attorney, Agent, or Firm* — Carlson, Gaskey & Olds, P.C.

(57) ABSTRACT

The disclosure provides an intelligent method and system for monitoring pig behavior abnormality. The method comprises: acquiring an instantaneous acceleration of a pig; calculating an instantaneous acceleration variation according to the instantaneous acceleration; calculating a sampling characteristic value according to the instantaneous acceleration and the instantaneous acceleration variation; calculating a threshold according to historical data; drawing a box diagram according to the sampling characteristic value and the threshold; judging whether the sampling characteristic value exceeds the threshold according to the box diagram; if not, reacquiring the instantaneous acceleration of the pig and calculate the instantaneous acceleration variation; and if so, sending an alarm signal. An alarm signal is sent out after an abnormal behavior is detected by comparing the sampling characteristic value and the threshold, so that the abnormal behavior of the pig can be found in time, and the feeding safety is improved.

19 Claims, 2 Drawing Sheets

(51) Int. Cl.
*A01K 1/10* (2006.01)
*A01K 1/02* (2006.01)
*A01K 5/01* (2006.01)
*G06N 3/04* (2006.01)
*G08B 23/00* (2006.01)

(52) U.S. Cl.
CPC ............. *A01K 29/005* (2013.01); *G06N 3/04* (2013.01); *G08B 23/00* (2013.01)

(58) Field of Classification Search
CPC ....... G08B 23/00; G08B 21/18; H04L 67/025; H04L 43/045; H04L 43/08; H04L 43/16; H04L 67/12; G06Q 50/02
USPC ...................................... 340/573.3
See application file for complete search history.

(56) References Cited

U.S. PATENT DOCUMENTS

| | | | | |
|---|---|---|---|---|
| 2016/0178392 | A1* | 6/2016 | Goldfain | G16H 40/63 |
| | | | | 702/158 |
| 2016/0227742 | A1* | 8/2016 | Rovnyi | A61B 5/11 |
| 2018/0146645 | A1* | 5/2018 | Arbel | A01K 11/006 |
| 2020/0323170 | A1* | 10/2020 | Garigan | A01K 27/009 |
| 2021/0137078 | A1* | 5/2021 | Yamamoto | A01K 11/006 |

* cited by examiner

INTELLIGENT METHOD AND SYSTEM FOR MONITORING PIG BEHAVIOR ABNORMALITY

CROSS-REFERENCE TO RELATED APPLICATION

This application claims the benefit of priority to Chinese Patent Application No. 202010101545.7 titled "INTELLIGENT METHOD AND SYSTEM FOR MONITORING PIG BEHAVIOR ABNORMALITY", filed with the Chinese State Intellectual Property Office on Feb. 19, 2020, the entire disclosure of which is incorporated herein by reference.

TECHNICAL FIELD

The disclosure relates to the field of motion state identification, in particular to an intelligent method and system for monitoring pig behavior abnormality.

BACKGROUND

With a rapid development of China's intelligent agricultural production, National Medium- and Long-term Science and Technology Development Program (2006-2020) has clearly brought a "precise operation and informatization of agriculture" into an optimization subject. Therefore, an establishment of a modern livestock and poultry feeding management system by using big data technology is of great significance to development of China's agricultural modernization and improvement of agricultural competitiveness.

In alive pig feeding process, some abnormal signs appears for an epidemic disease, oestrus and other phenomena of pigs, but the traditional method excessively depends on the long-term feeding experience of feeders. The probability of an abnormal behavior occurring in practical feeding of live pigs is not high, and the abnormal behavior is not easily found by production managers. Therefore, how to realize timely monitoring of the live pig abnormal behavior has become a problem to be settled urgently.

SUMMARY

The disclosure intends to provide an intelligent method and system for monitoring pig behavior abnormality to detect an abnormal behavior of a live pig timely.

In order to achieve the above effect, the disclosure provides the following solutions.

An intelligent method for monitoring pig behavior abnormality comprises:
  acquiring an instantaneous acceleration of a live pig;
  calculating an instantaneous acceleration variation according to the instantaneous acceleration;
  calculating a sampling characteristic value according to the instantaneous acceleration and the instantaneous acceleration variation;
  calculating a threshold according to historical data;
  drawing a box diagram according to the sampling characteristic value and the threshold;
  judging whether the sampling characteristic value exceeds the threshold according to the box diagram;
  if not, reacquiring the instantaneous acceleration of the live pig, and returning to calculate the instantaneous acceleration variation according to the instantaneous acceleration; and
  if so, sending an alarm signal to a feeder.

Optionally, the calculating the instantaneous acceleration variation according to the instantaneous acceleration specifically comprises: calculating the instantaneous acceleration variation according to a formula $$\Delta acc_x(k) = acc_x(k) - acc_x(k-1)$$

$$\Delta acc_y(k) = acc_y(k) - acc_y(k-1)$$

$$\Delta acc_z(k) = acc_z(k) - acc_z(k-1);$$

wherein $\Delta acc_x(k)$, $\Delta acc_y(k)$ and $\Delta acc_z(k)$ are instantaneous acceleration variations in three axial directions respectively, k is the number of sampling points, and $acc_x(k)$, $acc_y(k)$ and $\Delta acc_z(k)$ are the instantaneous accelerations in the three axial directions respectively.

Optionally, the calculating the sampling characteristic value according to the instantaneous acceleration and the instantaneous acceleration variation comprises:
  calculating a first characteristic value according to the instantaneous acceleration variation;
  calculating a second characteristic value according to the instantaneous acceleration; and
  calculating the sampling characteristic value according to the first characteristic value and the second characteristic value.

Optionally, the calculating the first characteristic value according to the instantaneous acceleration variation specifically comprises: calculating the first characteristic value according to a formula $$T_1(k) = \sqrt{\Delta acc_x(k)^2 + \Delta acc_y(k)^2 + \Delta acc_z(k)^2};$$

wherein $T_1(k)$ is the first characteristic value.

Optionally, the calculating the second characteristic value according to the instantaneous acceleration comprises:
  acquiring a standard deviation value of a current sampling point according to the instantaneous acceleration; and
  calculating the second characteristic value according to the standard deviation value.

Optionally, the acquiring the standard deviation value of the current sampling point according to the instantaneous acceleration specifically comprises: calculating the standard deviation value of the current sampling point according to a formula $$t_2[k] = std(\tilde{x}[k]);$$

wherein $t_2[k]$ is the standard deviation value of the current sampling point, $\tilde{x}[k] = [\vec{x}[k-N], \ldots \vec{x}[k]]$, $\vec{x}[k] = (acc_x(k), acc_y(k), acc_z(k))$, and N is a set value.

Optionally, the calculating the second characteristic value according to the standard deviation value specifically comprises: calculating the second characteristic value according to a formula $T_2[k] = SQRT(t_2[k])$; where $T_2[k]$ is the second characteristic value.

Optionally, the calculating the sampling characteristic value according to the first characteristic value and the second characteristic value specifically comprises: calculating the sampling characteristic value according to a formula $T[k] = \max(T_1[k])^2 \cdot \max(T_2[k])^2$; wherein $T[k]$ is the sampling characteristic value.

Optionally, the calculating the threshold according to the historical data specifically comprises:
  setting a proportion of daily activity data and abnormal activity data in the historical data both to be 50 percent;
  dividing the historical data into M equal parts to generate M data sets;
  for each of the data sets: taking the data set as a test set and others as training sets, training a neural network by using the training sets, and testing the trained neural network by using the test set to generate a test value; and averaging M test values to generate the threshold.

In order to achieve the above effect, the disclosure also provides the following technical solution.

An intelligent system for monitoring pig behavior abnormality comprises:

an acquisition unit configured to acquire an instantaneous acceleration of a live pig;

an variation calculation unit connected with the acquisition unit and configured to calculate an instantaneous acceleration variation according to the instantaneous acceleration;

a sampling characteristic value calculation unit connected with the acquisition unit and the variation calculation unit respectively and configured to calculate a sampling characteristic value according to the instantaneous acceleration and the instantaneous acceleration variation;

a threshold calculation unit configured to calculate a threshold according to historical data;

a drawing unit connected with the sampling characteristic value calculation unit and the threshold calculation unit respectively and configured to draw a box diagram according to the sampling characteristic value and the threshold;

a judgment unit connected with the drawing unit and configured to judge whether the sampling characteristic value exceeds the threshold according to the box diagram;

a control unit connected with the judgment unit and the acquisition unit respectively and configured to control the acquisition unit to reacquire the instantaneous acceleration of the live pig when a judgment result from the judgment unit is negative; and an alarm unit connected with the judgment unit and configured to send an alarm signal to a feeder when the judgment result from the judgment unit is positive.

According to the detailed embodiments of the disclosure, the disclosure can achieve following technical effects:

According to the disclosure, the characteristic value of the instantaneous acceleration of the live pig is calculated, the characteristic value is compared with the threshold calculated according to historical data to determine whether the behavior of the live pig is normal or not, and an alarm signal is sent out after the abnormal behavior is detected, so that the abnormal behavior of the live pig can be found in time to improve the feeding safety.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

In order to more clearly explain the embodiments of the present disclosure or the technical solutions in the conventional technology, the drawings used in the embodiments will be briefly described below. Obviously, the drawings in the following description are only some embodiments of the present disclosure. For those skilled in the art, other drawings may be obtained based on the drawings without creative efforts.

DESCRIPTION OF REFERENCE NUMERALS

1, an acquisition unit; 2, a variation calculation unit; 3, a sampling characteristic value calculation unit; 4, a threshold calculation unit; 5, a drawing unit; 6, a judgment unit; 7, a control unit; and 8, an alarm unit.

DETAILED DESCRIPTION

In the following, the technical solutions in the embodiments of the present disclosure will be clearly and completely described with reference to the drawings in the embodiments of the present disclosure. Obviously, the described embodiments are only a part of the embodiments of the present disclosure, but not all the embodiments. Based on the embodiments of the present disclosure, all other embodiments obtained by those skilled in the art without any creative efforts shall fall within the scope of the present disclosure.

The disclosure intends to provide an intelligent method and system for monitoring pig behavior abnormality to detect abnormal behaviors of live pigs timely.

For a better understanding of above intention, features and advantages of the present disclosure, the disclosure will be described in details by reference to the accompanying drawings and specific embodiments thereof.

Figure 1:
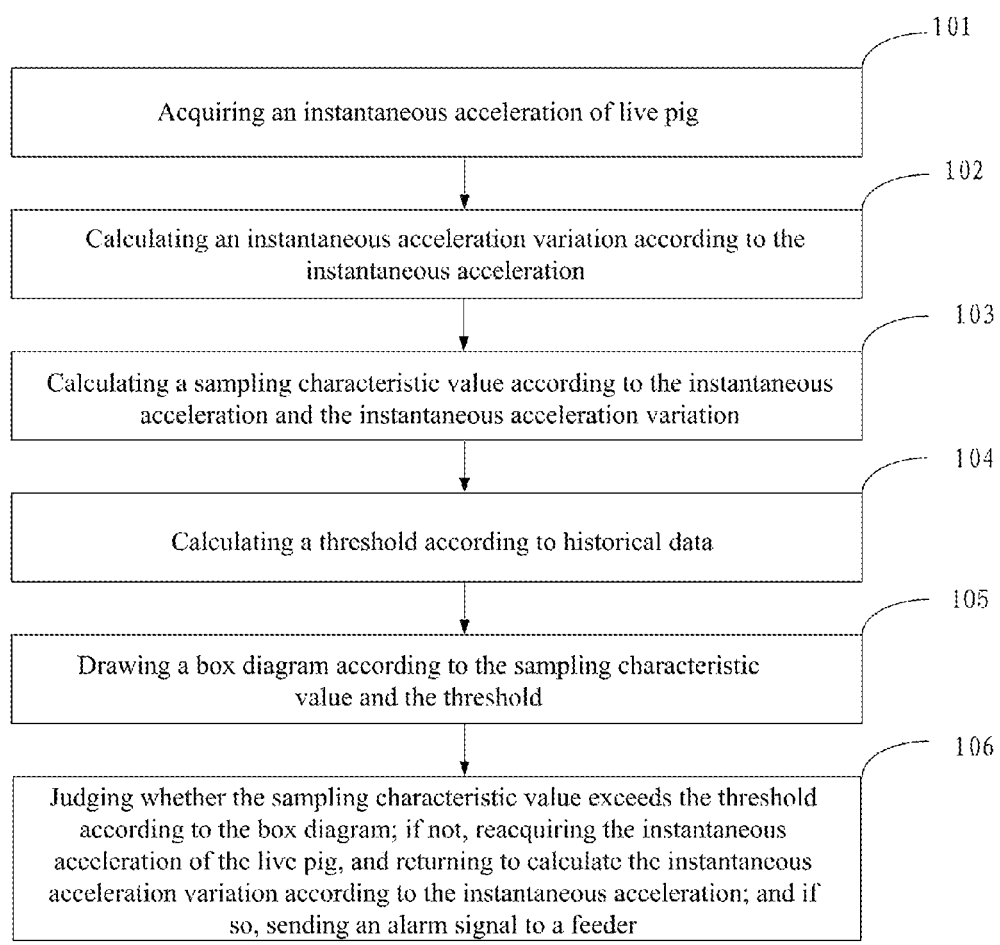
FIG. 1 is a flow diagram of an intelligent method for monitoring pig behavior abnormality according to the present disclosure.

FIG. 1 is a flow diagram of the intelligent method for monitoring pig behavior abnormality according to an exemplary embodiment of this disclosure. As shown in FIG. 1, the intelligent method for monitoring pig behavior abnormality comprises steps of:

step 101: acquiring instantaneous acceleration of a live pig;

step 102: calculating an instantaneous acceleration variation according to the instantaneous acceleration;

step 103: calculating a sampling characteristic value according to the instantaneous acceleration and the instantaneous acceleration variation;

step 104: calculating a threshold according to historical data;

step 105: drawing a box diagram according to the sampling characteristic value and the threshold;

step 106: judging whether the sampling characteristic value exceeds the threshold according to the box diagram;

if not, reacquiring the instantaneous acceleration of the live pig, and returning to the step 102; and if so, sending an alarm signal to a feeder.

The intelligent method for monitoring pig behavior abnormality of the disclosure is performed by calculating the characteristic value of the instantaneous acceleration of the live pig, comparing the characteristic value with the threshold calculated according to historical data to determine whether the behavior of the live pig is normal or abnormal, and sending out an alarm signal when the abnormal behavior is detected, so that the abnormal behavior of the live pig can be found by the feeder in time, and the feeding safety is improved.

The step 101 can specifically comprises steps of:
a first step 101 substep of arranging an acceleration sensor on the neck of the live pig;
a second step 101 substep of acquiring acquisition data from the acceleration sensor;
a third step 101 substep of carrying out low-pass filtering on the acquisition data to obtain noiseless data; and
a fourth step 101 substep of removing abnormal values in the noiseless data to generate an instantaneous acceleration.

Due to a small motion range of the neck of the live pig, the acceleration sensor can be mounted on the neck of the live pig to effectively reduce the data processing complexity. The accuracy of the data can be effectively improved by noiseless processing and abnormal value removal processing on the acquisition data, so as to increase the reliability of the alarm signal.

The step 102 can specifically comprises calculating the instantaneous acceleration variation according to a formula $$\Delta acc_x(k)=acc_x(k)-acc_x(k-1)$$

$$\Delta acc_y(k)=acc_y(k)-acc_y(k-1)$$

$$\Delta acc_z(k)=acc_z(k)-acc_z(k-1);$$

wherein $\Delta acc_x(k)$, $\Delta acc_y(k)$ and $\Delta acc_z(k)$ are instantaneous acceleration variations in three axial directions respectively, k is the number of sampling points, and $acc_x(k)$, $acc_y(k)$ and $acc_z(k)$ are the instantaneous accelerations in the three axial directions respectively.

The instantaneous accelerations of the live pig in three axial directions are collected to truly indicate the motion state of the live pig.

The step 103 can specifically comprises steps of:
a first step 103 substep of calculating a first characteristic value according to the instantaneous acceleration variation; wherein, the first characteristic value is specifically calculated according to a formula $T_1(k)=\sqrt{\Delta acc_x(k)^2+\Delta acc_y(k)^2+\Delta acc_z(k)^2}$ and $T_1(k)$ is the first characteristic value;
a second step 103 substep of calculating a second characteristic value according to the instantaneous acceleration; and
a third step 103 substep of calculating the sampling characteristic value according to the first characteristic value and the second characteristic value, wherein, the sampling characteristic value is specifically calculated according to a formula and $T[k]=\max(T_1[k])^2 \cdot \max(T_2[k])^2$ and $T[k]$ is the sampling characteristic value.

The second step 103 substep can include the step of:
acquiring a standard deviation value of a current sampling point according to the instantaneous acceleration; wherein, the standard deviation value of the current sampling point is specifically calculated according to a formula $t_2[k]=std(\tilde{x}[k])$;
wherein $t_2[k]$ is the standard deviation value of the current sampling point, $\tilde{x}[k]=[\vec{x}[k-N], \ldots, \vec{x}[k]]$, $\vec{x}[k]=(acc_x(k),acc_y(k),acc_z(k))$, and N is a set value;

The second step 103 substep can then further include the step of:
calculating the second characteristic value according to the standard deviation value; wherein, the second characteristic value is specifically calculated according to a formula $T_2[k]=SQRT(t_2[k])$ and $T_2[k]$ is the second characteristic value.

The step 104 can include steps of:
a first step 104 substep including setting a proportion of daily activity data and abnormal activity data in the historical data both to be 50 percent;
a second step 104 substep of dividing the historical data into M equal parts to generate M data sets;
a third step 104 substep of, for each of the data sets, taking the data set as a test set and others as training sets, training a neural network with the training sets, and testing the trained neural network with the test set to generate a test value; and
a fourth step 104 substep of averaging M test values to generate a threshold.

The following technical effects can be achieved by the present disclosure:
the data processing difficulty can be effectively reduced by mounting an acceleration sensor on the neck of a live pig;
instantaneous accelerations in three axial directions of the live pig are detected so that the actual motion state of the live pig can be well indicated;
during calculating the sampling characteristic value, the maximum value of the first characteristic values and the maximum value of the second characteristic values are multiplied to increase the influence of the micro behavior of the live pig on the sampling characteristic value and improve the monitoring reliability.

Figure 2:
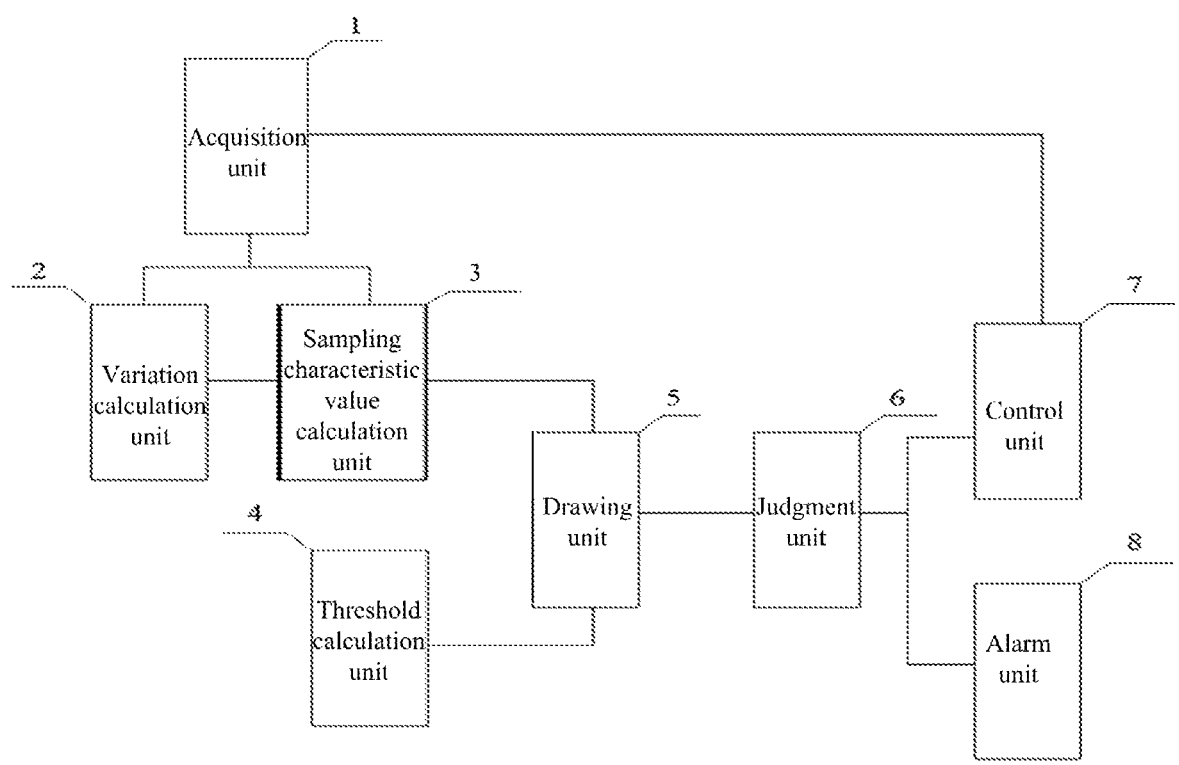
FIG. 2 is a structurally schematic diagram of an intelligent system for monitoring pig behavior abnormality according to the present disclosure.

In order to achieve above technical effects, the disclosure also provides a technical solution as follows:

An intelligent system for monitoring pig behavior abnormality is shown in FIG. 2. The system, in the exemplary embodiment, includes an acquisition unit 1, a variation calculation unit 2, a sampling characteristic value calculation unit 3, a threshold calculation unit 4, a drawing unit 5, a judgment unit 6, a control unit 7, and an alarm unit 8.

The acquisition unit 1 is configured to acquire an instantaneous acceleration of the live pig;
the variation calculation unit 2 is connected with the acquisition unit 1 and configured to calculate an instantaneous acceleration variation according to the instantaneous acceleration;
the sampling characteristic value calculation unit 3 is connected with the acquisition unit 1 and the variation calculation unit 2 respectively and configured to calculate a sampling characteristic value according to the instantaneous acceleration and the instantaneous acceleration variation;
the threshold calculation unit 4 is configured to calculate a threshold according to historical data;
the drawing unit 5 is connected with the sampling characteristic value calculation unit 3 and the threshold calculation unit 4 respectively and configured to draw a box diagram according to the sampling characteristic value and the threshold;
the judgment unit 6 is connected with the drawing unit 5 and configured to judge whether the sampling characteristic value exceeds the threshold according to the box diagram;
the control unit 7 is connected with the judgment unit 6 and the acquisition unit 1 respectively and configured to control the acquisition unit 1 to reacquire the instantaneous acceleration of the live pig when a judgment result from the judgment unit 6 is negative; and
the alarm unit 8 is connected with the judgment unit 6 and configured to send an alarm signal to a feeder when the judgment result from the judgment unit 6 is positive.

compared with the conventional technology, the intelligent system for monitoring pig behavior abnormality has the same beneficial effects as the intelligent method for monitoring pig behavior abnormality, which will not be described in details.

Various embodiments of the description have been described in a progressive way, each of which emphasizes the difference from the others, and among which the same and similar parts can be referred to each other.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An intelligent method for monitoring pig behavior abnormality, comprising:
    acquiring an instantaneous acceleration of a live pig;
    calculating an instantaneous acceleration variation according to the instantaneous acceleration;
    calculating a sampling characteristic value according to the instantaneous acceleration and the instantaneous acceleration variation;
    calculating a threshold according to historical data;
    drawing a box diagram according to the sampling characteristic value and the threshold;
    judging whether the sampling characteristic value exceeds the threshold according to the box diagram;
    under a condition that the sampling characteristic value does not exceed the threshold, reacquiring the instantaneous acceleration of the live pig, and returning to calculate the instantaneous acceleration variation according to the instantaneous acceleration; and
    under a condition that the sampling characteristic value exceeds the threshold, sending an alarm signal to a feeder.

2. The intelligent method for monitoring pig behavior abnormality according to claim 1, wherein the calculating the instantaneous acceleration variation according to the instantaneous acceleration comprises:
    calculating the instantaneous acceleration variation according to a formula $\Delta acc_x(k) = acc_x(k) - acc_x(k-1)$ $\Delta acc_y(k) = acc_y(k) - acc_y(k-1)$ $\Delta acc_z(k) = acc_z(k) - acc_z(k-1);$ wherein $\Delta acc_x(k)$, $\Delta acc_y(k)$ and $\Delta acc_z(k)$ are instantaneous acceleration variations in three axial directions respectively, k is the number of sampling points, and $acc_x(k)$, $acc_y(k)$ and $acc_z(k)$ are the instantaneous accelerations in the three axial directions respectively.

3. The intelligent method for monitoring pig behavior abnormality according to claim 1, wherein the calculating the sampling characteristic value according to the instantaneous acceleration and the instantaneous acceleration variation comprises:
    calculating a first characteristic value according to the instantaneous acceleration variation;
    calculating a second characteristic value according to the instantaneous acceleration; and
    calculating the sampling characteristic value according to the first characteristic value and the second characteristic value.

4. The intelligent method for monitoring pig behavior abnormality according to claim 3, wherein the calculating the first characteristic value according to the instantaneous acceleration variation comprises:
    calculating the first characteristic value according to a formula $T_1(k) = \sqrt{\Delta acc_x(k)^2 + \Delta acc_y(k)^2 + \Delta acc_z(k)^2}$;
    wherein $T_1(k)$ is the first characteristic value.

5. The intelligent method for monitoring pig behavior abnormality according to claim 3, wherein the calculating a second characteristic value according to the instantaneous acceleration comprises:
    acquiring a standard deviation value of a current sampling point according to the instantaneous acceleration; and
    calculating the second characteristic value according to the standard deviation value.

6. The intelligent method for monitoring pig behavior abnormality according to claim 5, wherein the acquiring the standard deviation value of the current sampling point according to the instantaneous acceleration comprises:
    calculating the standard deviation value of the current sampling point according to a formula $t_2[k] = std(\tilde{x}[k])$;
    wherein $t_2[k]$ is the standard deviation value of the current sampling point, $\tilde{x}[k] = [\vec{x}[k-N], \ldots \vec{x}[k]]$, $\vec{x}[k] = (acc_x(k), acc_y(k), acc_z(k))$, and N is a set value.

7. The intelligent method for monitoring pig behavior abnormality according to claim 5, wherein the calculating the second characteristic value according to the standard deviation value comprises calculating the second characteristic value according to a formula $T_2[k] = SQRT(t_2[k])$;
    wherein $T_2[k]$ is the second characteristic value.

8. The intelligent method for monitoring pig behavior abnormality according to claim 3, wherein the calculating the sampling characteristic value according to the first characteristic value and the second characteristic value comprises:
    calculating the sampling characteristic value according to a formula $T[k] = \max(T_1[k])^2 \cdot \max(T_2[k])^2$; wherein $T[k]$ is the sampling characteristic value.

9. The intelligent method for monitoring pig behavior abnormality according to claim 1, wherein the calculating a threshold according to historical data comprises:
    setting a proportion of daily activity data and abnormal activity data in the historical data both to be 50 percent;
    dividing the historical data into M equal parts to generate M data sets;
    for each of the data sets: taking a data set as a test set and others as training sets, training a neural network by using the training sets, and testing the trained neural network by using the test set to generate a test value; and
    averaging M test values to generate the threshold.

10. An intelligent system for monitoring pig behavior abnormality, comprising:
    an acquisition unit configured to acquire an instantaneous acceleration of a live pig;
    a variation calculation unit connected with the acquisition unit and configured to calculate an instantaneous acceleration variation according to the instantaneous acceleration;
    a sampling characteristic value calculation unit connected with the acquisition unit and the variation calculation unit respectively and configured to calculate a sampling characteristic value according to the instantaneous acceleration and the instantaneous acceleration variation;
    a threshold calculation unit configured to calculate a threshold according to historical data;

a drawing unit connected with the sampling characteristic value calculation unit and the threshold calculation unit respectively and configured to draw a box diagram according to the sampling characteristic value and the threshold;

a judgment unit connected with the drawing unit and configured to judge whether the sampling characteristic value exceeds the threshold according to the box diagram;

a control unit connected with the judgment unit and the acquisition unit respectively and configured to control the acquisition unit to reacquire the instantaneous acceleration of the live pig when a judgment result from the judgment unit is negative; and an alarm unit connected with the judgment unit and configured to send an alarm signal to a feeder when the judgment result from the judgment unit is positive.

11. An intelligent method for monitoring pig behavior abnormality, comprising:
acquiring an instantaneous acceleration of a live pig;
calculating an instantaneous acceleration variation according to the instantaneous acceleration;
calculating a sampling characteristic value according to the instantaneous acceleration and the instantaneous acceleration variation;
calculating a threshold according to historical data;
comparing the sampling characteristic value and the threshold;
based, at least in part, on the comparing, judging whether the sampling characteristic value exceeds the threshold;
under a condition that the sampling characteristic value does not exceed the threshold, reacquiring the instantaneous acceleration of the live pig, and returning to calculate the instantaneous acceleration variation according to the instantaneous acceleration; and
under a condition that the sampling characteristic value exceeds the threshold, sending an alarm signal to a feeder.

12. The intelligent method for monitoring pig behavior abnormality according to claim 11, wherein the calculating the instantaneous acceleration variation according to the instantaneous acceleration comprises:
calculating the instantaneous acceleration variation according to a formula $$\Delta acc_x(k)=acc_x(k)-acc_x(k-1)$$

$$\Delta acc_y(k)=acc_y(k)-acc_y(k-1)$$

$$\Delta acc_z(k)=acc_z(k)-acc_z(k-1);$$

wherein $\Delta acc_x(k)$, $\Delta acc_y(k)$ and $\Delta acc_z(k)$ are instantaneous acceleration variations in three axial directions respectively, k is the number of sampling points, and $acc_x(k)$, $acc_y(k)$ and $acc_z(k)$ are the instantaneous accelerations in the three axial directions respectively.

13. The intelligent method for monitoring pig behavior abnormality according to claim 11, wherein the calculating the sampling characteristic value according to the instantaneous acceleration and the instantaneous acceleration variation comprises:

calculating a first characteristic value according to the instantaneous acceleration variation;
calculating a second characteristic value according to the instantaneous acceleration; and
calculating the sampling characteristic value according to the first characteristic value and the second characteristic value.

14. The intelligent method for monitoring pig behavior abnormality according to claim 13, wherein the calculating the first characteristic value according to the instantaneous acceleration variation comprises:
calculating the first characteristic value according to a formula $T_1(k)=\sqrt{\Delta acc_x(k)^2+\Delta acc_y(k)^2+\Delta acc_z(k)^2}$;
wherein $T_1(k)$ is the first characteristic value.

15. The intelligent method for monitoring pig behavior abnormality according to claim 13, wherein the calculating a second characteristic value according to the instantaneous acceleration comprises:
acquiring a standard deviation value of a current sampling point according to the instantaneous acceleration; and
calculating the second characteristic value according to the standard deviation value.

16. The intelligent method for monitoring pig behavior abnormality according to claim 15, wherein the acquiring the standard deviation value of the current sampling point according to the instantaneous acceleration comprises:
calculating the standard deviation value of the current sampling point according to a formula $t_2[k]=std(\tilde{x}[k])$;
wherein $t_2[k]$ is the standard deviation value of the current sampling point, $\tilde{x}[k]=[\vec{x}[k-N], \ldots \vec{x}[k]]$, $\vec{x}[k]=(acc_x(k),acc_y(k),acc_z(k))$, and N is a set value.

17. The intelligent method for monitoring pig behavior abnormality according to claim 15, wherein the calculating the second characteristic value according to the standard deviation value comprises calculating the second characteristic value according to a formula $T_2[k]=SQRT(t_2[k])$;
wherein $T_2[k]$ is the second characteristic value.

18. The intelligent method for monitoring pig behavior abnormality according to claim 13, wherein the calculating the sampling characteristic value according to the first characteristic value and the second characteristic value comprises:
calculating the sampling characteristic value according to a formula $T[k]=max(T_1[k])^2 \cdot max(T_2[k])^2$; wherein $T[k]$ is the sampling characteristic value.

19. The intelligent method for monitoring pig behavior abnormality according to claim 11, wherein the calculating a threshold according to historical data comprises:
setting a proportion of daily activity data and abnormal activity data in the historical data both to be 50 percent;
dividing the historical data into M equal parts to generate M data sets;
for each of the data sets: taking a data set as a test set and others as training sets, training a neural network by using the training sets, and testing the trained neural network by using the test set to generate a test value; and
averaging M test values to generate the threshold.

* * * * *